United States Patent [19]

Rahman

[11] 4,178,160
[45] Dec. 11, 1979

[54] HUMIDIFIER DUCT SYSTEM

[75] Inventor: Michael Rahman, Winston-Salem, N.C.

[73] Assignee: Envirotech Corporation, Menlo Park, Calif.

[21] Appl. No.: 900,034

[22] Filed: Apr. 25, 1978

[51] Int. Cl.² .............................................. B01D 45/00
[52] U.S. Cl. ........................................ 55/436; 55/440
[58] Field of Search ......................... 55/434, 436–440, 55/442, 443; 49/504; 52/489, 463; 312/140, 257 SU, 257 SM; 98/121 R, 121 A; 210/521

[56] References Cited

U.S. PATENT DOCUMENTS

| | | | |
|---|---|---|---|
| 1,501,559 | 7/1924 | Kaup | 55/436 |
| 1,899,017 | 2/1933 | Dauphinee | 55/440 |
| 2,752,005 | 6/1956 | Avera et al. | 55/436 |
| 3,276,193 | 10/1966 | Lamb | 55/436 |
| 3,864,110 | 2/1975 | Wyman et al. | 55/440 |

*Primary Examiner*—Bernard Nozick

*Attorney, Agent, or Firm*—William S. Bernheim; John J. Morrissey

[57] ABSTRACT

A duct system for distributing humidified air from a humidifier has a duct and an eliminator sheet assembly mounted at an outlet of the duct. The eliminator sheet assembly includes eliminator sheets movably mounted in the outlet of the duct, and means for securing the eliminator sheets in a plurality of positions so that the direction of air discharged from the outlet can be changed. A structural member for mounting the eliminator sheet assembly at the duct includes a track defined by sidewalls, one of which sidewalls extends upward of the other to capture droplets emitted from the eliminator sheet assembly, and a drain plate assembly for catching condensation falling from the duct. The drain plate assembly includes an elongated trough for attachment to the duct, the trough having two sidewalls and a flexible partition. The partition has an inverted V-shaped cross section and divides the trough into two compartments extending side-by-side.

4 Claims, 9 Drawing Figures

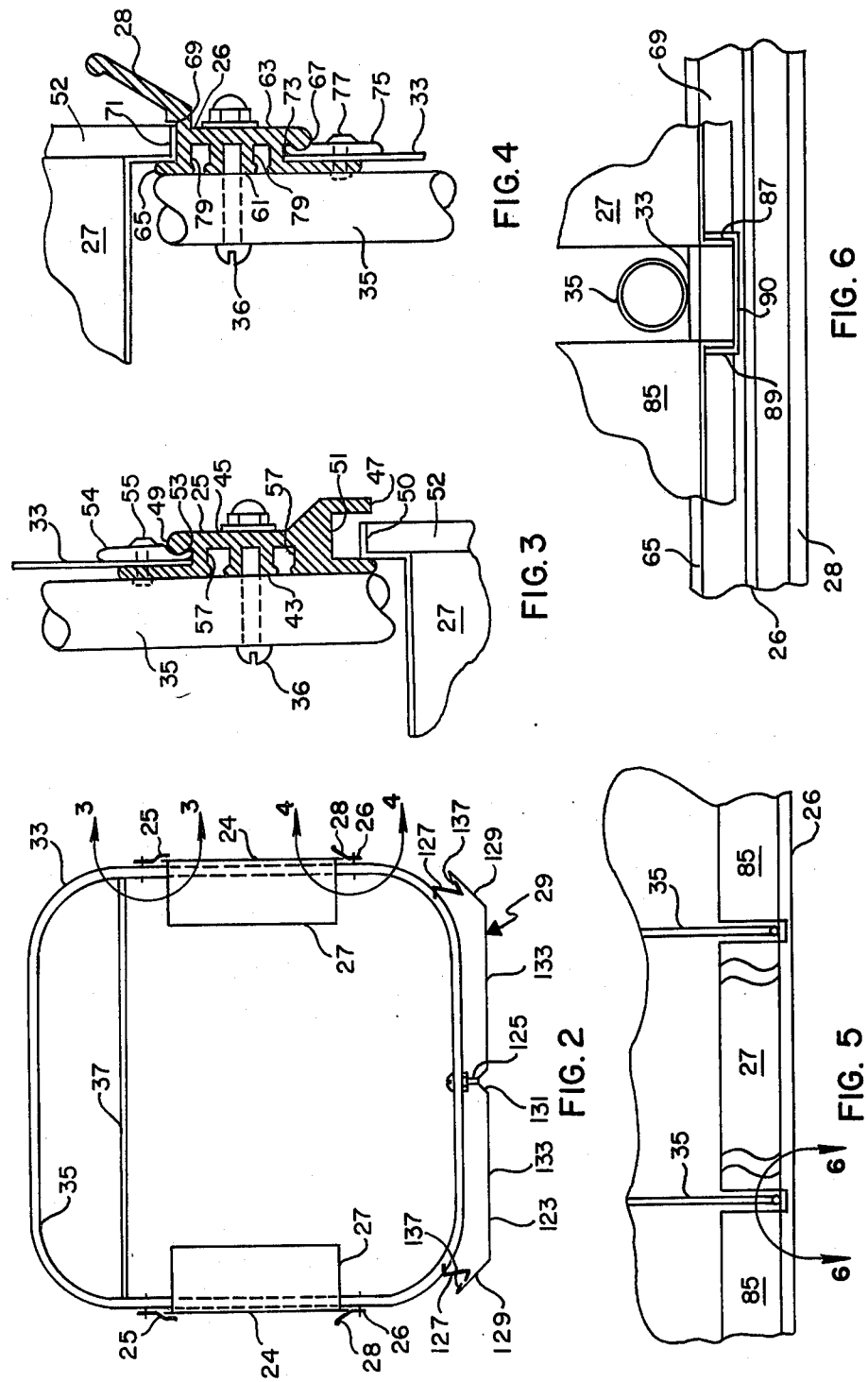

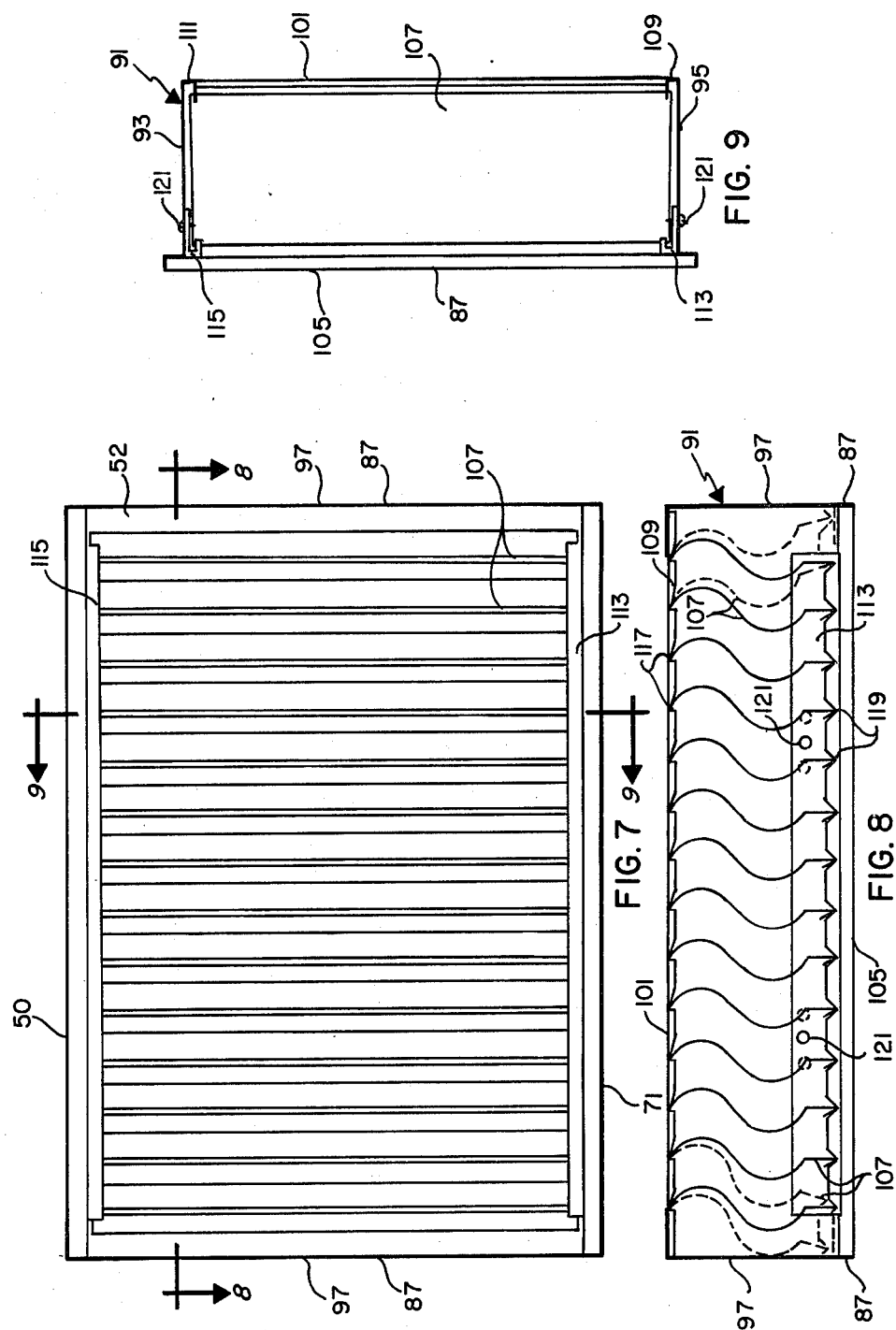

HUMIDIFIER DUCT SYSTEM

BACKGROUND

This invention relates to a duct system for distributing humidified air from humidifying apparatus. More particularly, this invention relates to an eliminator sheet assembly to be mounted at an outlet of a duct system, a structural member for mounting the eliminator plate assembly, and a drain plate assembly.

Centrifugal humidifiers are often utilized to increase the humidity in textile and other industrial processing rooms. To distribute the humidified air, which also contains a quantity of water in the form of fine droplets, to different locations in such rooms, a duct system is coupled to receive this air from the humidifier. A conventional duct system includes an elongated duct admitting humidified air at one end and discharging the humidified air at outlets formed at intervals along the sides of the duct.

In addition, the duct system includes eliminator sheet assemblies mounted at the outlets to remove a limited part of the droplets entrained in the humidified air. The eliminator sheet assemblies are therefore often referred to as limited eliminators. Typically, the eliminator sheet assemblies remove all droplets above a certain size, such as 60 microns. Droplets smaller than this certain size are allowed to leave the outlets with the air in the form of a fine mist.

Further, the duct system typically includes means for capturing droplets being emitted at the outlets from the lower region of the eliminator sheet assemblies, and a drain plate assembly mounted to extend beneath the duct to catch condensation falling from the duct.

One drawback of the previous duct systems has involved directing the flow of air from the outlets in directions other than straight out, for example to one side or the other. Duct systems are normally hung to extend along ceilings; and because of obstructions, such as beams and piping, different directions of air discharge are preferred. In the past, to change the air discharge direction has required the replacement of one eliminator sheet assembly by another. The air discharge direction is normally determined by the position of the eliminator sheets mounted within the assembly; and heretofore the position of the eliminator sheets has been fixed for a particular assembly. Furthermore, the eliminator sheets of the prior art have had directional characteristics which have prevented eliminator sheet assemblies from being moved from one side to the other of a duct without the eliminator sheet being inverted.

The droplet capturing means employed at duct outlets in the prior art have typically included a pan or sheet extending outward from the side of the duct opposite an outlet. This pan or sheet served no purpose other than capturing droplets. The pan or sheet added significant weight, which is a disadvantage when hanging a duct system for a ceiling.

Previous drain plate assemblies for duct systems have had to compromise between ease of cleaning and the time interval between cleanings. The drain plate assemblies of the prior art have typically included flat-bottomed trough mounted to extend beneath the duct, with the trough having approximately the same width as the duct. The compromise centers on the closeness with which the trough is mounted to the duct. If the trough were mounted at a distance allowing cleaning in place, the accumulation of waste and dust in the trough from circulation of room air over the trough would be accelerated and the interval between cleanings would be reduced. If the trough were mounted in closer proximity to the duct, cleaning would require removal of the trough.

OBJECTS OF THE INVENTION

It is an object of the present invention to provide an eliminator sheet assembly for mounting at an outlet of a duct system, which assembly is invertible and has means for adjusting the direction in which a flow of air discharges from the outlet so that the assembly can be used on either side of a duct and need not be replaced to change the air discharge direction.

Another object is to provide a droplet capturing means for a duct system, which means is integrated with means for mounting an eliminator sheet assembly at an outlet of the duct system.

Yet another object is to provide a drain plate assembly, which is mounted in close proximity to a duct and is cleanable essentially in place.

BRIEF DESCRIPTION OF THE DRAWINGS

Further objects and advantages of the invention may be readily ascertained by reference to the following description and appended drawings, which are offered by way of description only and not in limitation of the invention, the scope of which is defined in the claims.

In the drawings:

FIG. 2 is a cross-sectional view of the duct system of the present invention viewed along line 2—2;

FIG. 3 is an enlarged fragmentary view of that portion of the duct system of the present invention delineated by line 3—3 of FIG. 2;

FIG. 4 is an enlarged fragmentary view of that portion of the duct system of the present invention delineated by line 4—4 of FIG. 2;

FIG. 5 is a top sectional view of the duct system of the present invention taken along line 5—5 of FIG. 1;

FIG. 6 is an enlarged fragmentary view of that portion of the duct system of the present invention delineated by line 6—6 of FIG. 5;

FIG. 7 is an enlarged front view of one of the eliminator sheet assemblies shown in FIG. 1;

FIG. 8 is a top sectional view of the eliminator sheet assembly shown in FIG. 7 viewed along line 8—8; and FIG. 9 is a side view of the eliminator sheet assembly shown in FIG. 7 viewed along line 9—9.

PREFERRED EMBODIMENT OF THE INVENTION

Figure 1:
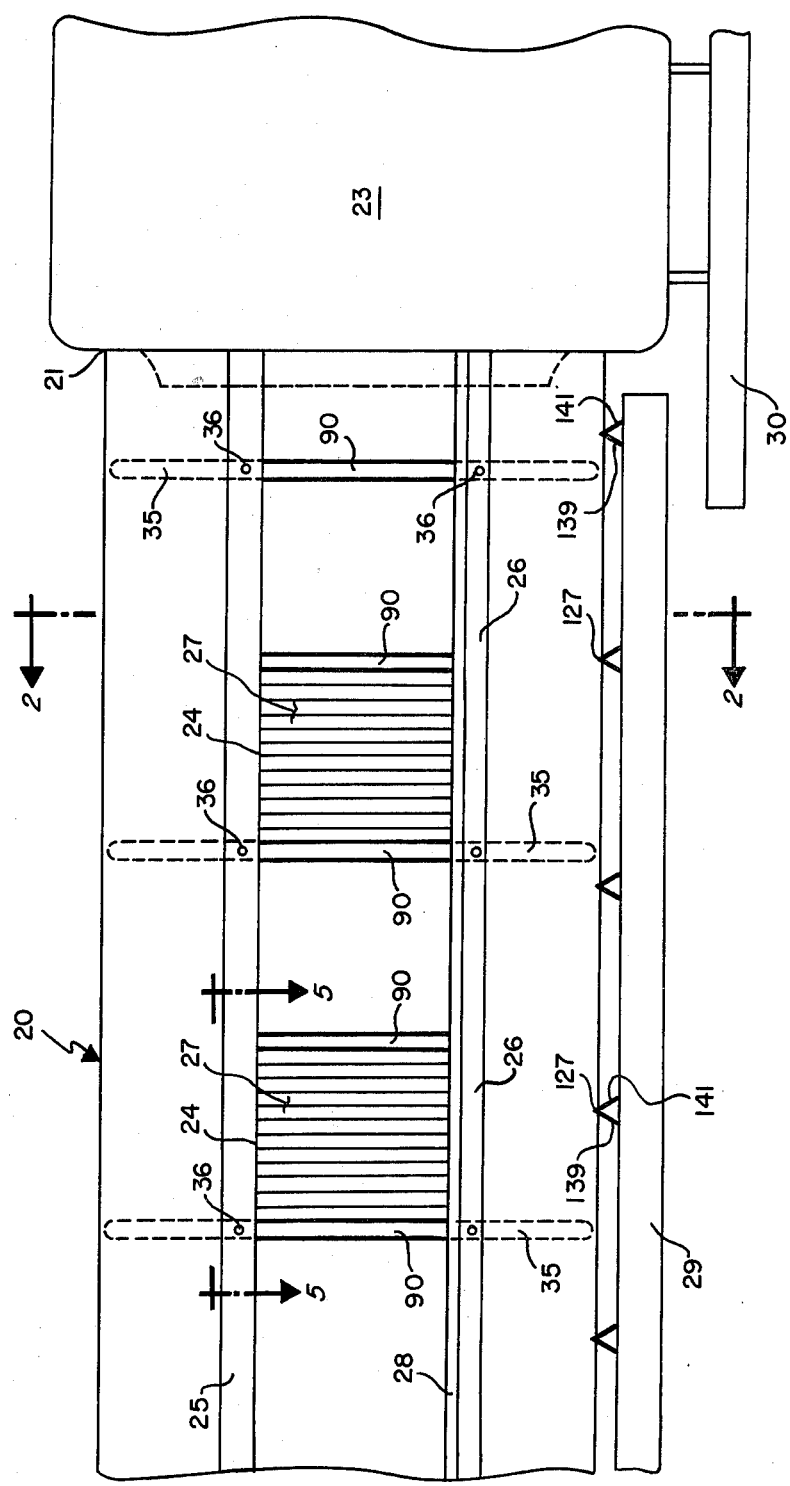
FIG. 1 is a partial side view of a duct system according to the present invention.

As shown generally in FIG. 1, the duct system includes an elongated duct 20 having an inlet end 21 for admitting humidified air from a conventional humidifier generally indicated by box 23, with outlets 24 spaced along sides of the duct 20 for discharging humidified air. The duct system further includes upper and lower mounting bars 25 and 26 extending in parallel along the sides of the duct 20 for supporting eliminator sheet assemblies 27 mounted to the sides of the duct 20 to define the outlets 24. The lower mounting bar 26 includes a lip 28 to capture droplets emitted from the eliminator sheet assemblies 27.

Further, the duct system includes a drain plate assembly 29 mounted to extend beneath the duct 20 to capture condensate falling from the duct. Liquid captured by the drain plate assembly 29 flows to a drain pan 30 located beneath the humidifier 23.

As shown in cross section in FIG. 2, the duct 20 includes an elongated structural frame and a skin or duct wall 33 of aluminum which is attached to enclose the frame. The frame includes the mounting bars 25 and 26 and rectangular bands 35, preferably formed of tubing, with rounded corners. The bands 35 are spaced at intervals along the duct 20 and extend around the interior of the duct wall 33, which is attached to the bands 35 by rivets or the like. As shown in FIG. 2, further side-to-side rigidity can be provided to the bands 35 by cross members 37 which traverse the duct to connect opposite sides of each band 35.

Returning to FIG. 1, the upper and lower mounting bars 25 and 26 serve to provide lengthwise rigidity to the frame and duct 20. As shown in FIGS. 3 and 4, respectively, the mounting bars 25 and 26 are secured to the bands 35 by bolts 36 or the like.

As shown in more detail in FIG. 3, the upper bar 25 has two partially parallel faces 43 and 45 extending vertically between two coved edges 47 and 49. A first 47 of the coved edges defines a track 51 into which the upper edge 50 of a frame 52 of one of the eliminator sheet assemblies 27 is mounted. The second edge 49 defines a groove 53 into which the duct wall 33 is fitted and secured, say by a shim 54 held in position with rivets 55 or the like. Channels 57 are formed recessed to the inside face 43 of the upper bar 25. The channels 57 reduce the weight of the bar 25 and are shaped so that the upper bar 25 is spliced (not shown in FIGS.) end to end to a second similar bar by a rod extending in each channel 57 and in a similar channel in the second similar bar.

As shown in more detail in FIG. 4, the lower bar 26 has two parallel faces 61 and 63 extending vertically between two coved edges 65 and 67. A first 65 of th coved edges defines a track 69 into which the lower edge 71 of the frame 52 of the eliminator sheet assembly 27 is mounted. The second edge 67 defines a groove 73 into which the duct wall 33 is fitted and secured with a shim 75 held in position with rivets 77. Channels 79 are formed recessed to the inside face 61 of the duct 20. The channels 79 reduce the weight of the bar 26, and are shaped so that the lower bar 26 is spliced end to end to a second similar bar by a rod extending in each channel 79 and in a similar channel in the second similar bar.

Further, the lower bar 26 includes the lip 28 for capturing droplets emitted from the lower region of the eliminator place assemblies 27. The lip 28 is an extension of the outside sidewall defining the track 69 upward of the other sidewall and outward from the outside face 63.

The bars 25 and 26 cooperatively define an opening along the sides of the duct 20. When the duct 20 is assembled as shown in FIG. 5, the opening is filled with eliminator sheet assemblies 27 and box-shaped blanking panels 85. The blanking panels 85 are mounted flush with the surface of the duct 20 and extend back into the duct 20 to channel the air in the duct 20 away from the surface between the bars 25 and 26 adjoining eliminator sheet assemblies 27, which would otherwise be an area of little air movement.

The eliminator sheet assemblies 27 and blanking panels 85 are mounted similarly. The assemblies 27 and panels 85 are first maneuvered into the duct 20 through the opening to be filled, and the upper edges of the assemblies 27 and panels 85 are then lifted into the upper track 51 far enough for the lower edges of the assemblies 27 and panels 85 to clear the inside sidewall of the lower track 69. The assemblies 27 and panels 85 are then rotated and the lower edges thereof are dropped into the lower track 69.

Assemblies 27 and panels 85 can adjoin themselves or with each other. The sides of the assemblies 27 and panels 85 are formed with flanges 87 and 89, respectively as shown in FIG. 6. Adjoining flanges are held by a U-shaped caping strip 90, as shown in FIG. 6, which fits over the flanges and extends between and fits into the tracks 51 and 69.

Returning to FIG. 1, the eliminator sheet assemblies 27 are mounted into the duct 20 to define the outlets 24. As shown in more detail in FIGS. 7, 8 and 9, each eliminator sheet assembly 27 includes an invertible rectangular housing 91, preferably symmetrical in design. The housing 91 includes a top 93, bottom 95 and upright sidewalls 97. The housing 91 further includes an inlet end 101 (FIG. 9) for admitting humidified air, which includes entrained droplets, to the housing 91 and an opposite aperture end 105 (FIG. 9) for discharging humidified air after removal of a limited part of the entrained droplets.

The housing 91 also includes the mounting frame 52 at the aperture end 105. As shown in FIG. 7, the frame 52 includes the upper edge 50 for mounting in track 51 (FIG. 3), the lower edge 71 for mounting in track 69 (FIG. 4), and sides including flanges 87 which engage with caping strips 90 to position the assembly 27 laterally (FIG. 6). The aperture end 105 is mounted flush (FIG. 5) with the sidewall of the duct 20, and the housing 91 extends back into the duct 20.

Inside the housing 91 as shown in FIG. 8, a plurality of eliminator sheets 107 are movably (heretofore fixedly) mounted in parallel. The sheets 107 are horizontally spaced from one another, disposed uprightly and generally parallel to the direction of flow of the air from the inlet end 101 to the aperture end 105 through the housing 91. The sheets 107 form a bundle having tortuous flow paths therebetween to channel and act on the humidified air passing through the bundle in order to remove a limited part of the entrained droplets and to determine the air discharge direction from the aperture end 105.

As shown in FIG. 9, four elongated U-shaped spacing members 109, 111, 113, 115 secure the sheets 107 in the housing 91. A first pair 109 and 111 of the spacing members are mounted to the housing 91 to extend side-to-side across the inlet end 101, one spacing member 109 adjacent the bottom 95 of the housing 91 and the other 111 adjacent the top 93. Equally spaced recesses 117 (FIG. 8) are made in a flat section of each spacing member 109 and 111. Each recess 117 engages the leading edge of one of the eliminator sheets 107.

A second pair 113 and 115 of the spacing members are movably mounted to the housing 91 to extend side-to-side across the aperture end 105, one spacing member 113 adjacent the bottom 95 and the other 115 adjacent the top 93. Equally spaced recesses 119 (FIG. 8) are made in a flat section of each spacing member 113 and 115. Each recess 119 engages the trailing edge of one of the eliminator sheets 107. Preferably the recesses 119 are formed by equal-sided angles cut into an edge of the flat section, the apexes of which angles engage the sheets 107.

To adjust the air discharge direction from the eliminator sheet assembly 27, the second pair 113 and 115 of spacing members can be secured to the housing 91 at different lateral positions. The second pair 113 and 115 of spacing members are secured to the housing 91 by screws 121 or the like. Multiple holes are provided in the housing 91, the bottom 95 and top 93, so that the lateral position of spacing the second pair 113 and 115 of members relative to the housing 91 is changed by securing the screws 121 in different holes (FIG. 8). Consequently, the position of the sheets 107 relative to the housing 91 is changed and thereby the direction of air discharge is changed.

Referring again to FIGS. 1 and 2, the drain plate assembly 29 includes a trough 123 and bolts 125 and clips 127 for attaching the trough 123 to extend beneath and along the duct 20. The width of the trough 123 is somewhat smaller than the width of the duct 20. The trough 123 includes two side walls 129, and a partition 131.

As shown in FIG. 2, the partition 131, which has an inverted V-shape cross section, divides the trough 123 into two equal-sized flat-bottomed compartments 133 extending side-by-side the length of the duct 20. The partition 131 is flexible to allow the V-shape to close so that when a sidewall 129 is detached from the duct 20, the adjacent compartment 133 tilts downward from the duct to allow cleaning of the compartment 133 essentially in place.

The bolts 125 attach the apex of the partition 131 to the duct 20. The partition 131 is flexible and the bolts 125 pass through the partition 131 above the surface of any liquid in the compartments 133 to avoid leaks.

The clips 127 attach the sidewalls 129 to the duct 20. Each of the trough sidewalls 129 is formed with a lip 137 which extends from the top of the sidewall 129 downward and inward toward the partition 131. The lip 137 forms a catch for the clips 27.

Each of the clips 127 (FIG. 1) has two arms 139, 141 with a hook at one end, a straight section at an angle to the arm, for engagement with the underside of the sidewall lip 137 (FIG. 2) at two spaced apart points to prevent the trough 123 from swaying. The arms 139, 141 join at their opposite end to form another hook which is engaged with a hole in the duct 20. In profile (FIG. 2), the clips 127 are Z-shaped so that any condensation flowing down the clips flows into the trough 123. The clips 127 are released from engagement with the lip 137 by rotating the clips 127 inward and away from the lip 137.

In operation, humidified air carrying entrained droplets enters the duct inlet 21 from a humidifier. The air flows through the duct 20 and discharges through one of the eliminator sheet assemblies 27. The eliminator sheet assemblies 27 remove a limited part of the entrained droplets from the humidified air prior to the humidified air discharging from the duct 20. The air discharge direction from the duct 20 depends on the position of the eliminator sheets 107. The air discharge direction can be changed by securing the second pair 113 and 115 of spacing members in a new position, which in turn repositions the eliminator sheets 107.

As the droplets collect in the eliminator sheet assemblies 27, droplets are occasionally emitted from the lower region of the assemblies 27. These droplets are captured by the mounting bar lip 28.

Under some operating conditions, condensation will form on the exterior of the duct 20. Condensation falling from the duct 20 is caught by the drain plate assembly 29.

It is thus apparent from the foregoing description that the eliminator sheet assemblies 27 can be inverted for use on either side of the duct 20, and can adjust the air discharge direction from the outlets 24 to any one of several directions. Consequently, these features allow the eliminator sheet assemblies 27 to replace a number of previously noninterchangeable eliminator sheet assemblies, and provide greater flexibility in changing the air discharge direction at a later time.

It is further apparent that the mounting bars 25 and 26 allow relatively easy mounting and replacement of eliminator sheet assemblies 27. Yet further it is seen that the droplet capturing means is part of the lower mounting bar 26, and thus a separate member to serve as such means is unnecessary.

Also it is apparent that the drain plate assembly 29 includes a trough 123 mounted in close proximity to the duct 20 to increase the duration between cleanings. Further, the trough 123 has a configuration adapted for relatively easy cleaning.

I claim:

1. An eliminator sheet assembly for mounting at an outlet of a duct in a system for distributing humidified air, said assembly comprising:

(a) a housing having a top, a bottom, two upright sidewalls, an inlet end for admitting a flow of humidified air which includes entrained droplets, and an aperture end for discharging this humidified air after removal of a limited part of the entrained droplets, said aperture end being opposite said inlet end;

(b) a plurality of eliminator sheets mounted in parallel in said housing, said eliminator sheets of said plurality being horizontally spaced from one another and being disposed uprightly and generally parallel to the direction of flow of the humidified air from said inlet end to said aperture end, said plurality of sheets forming a bundle having tortuous slow paths between said sheets to channel and act on the humidified air passing through said bundle to remove a limited part of the entrained droplets and to determine the direction of flow of air discharging from said aperture end;

(c) two pairs of spacing members for securing said plurality of eliminator sheets in said housing, a first pair of said spacing members being mounted to extend side-to-side across said inlet end, one member of said first pair being mounted adjacent said top of said housing and the other member of said first pair being mounted adjacent said bottom of said housing, each member of said first pair having recesses equally-spaced therealong for engagement with said eliminator sheets, each one of said recesses of said first pair of spacing members engaging a corresponding one of said eliminator sheets, and a second pair of said spacing members being mounted to extend side-to-side across said aperture end, one member of said second pair being mounted adjacent said top of said housing and the other member of said second pair being mounted adjacent said bottom of said housing, each member of said second pair having recesses equally-spaced therealong for engagement with said eliminator sheets, each one of said recesses of said second pair of spacing members engaging a corresponding one of said eliminator sheets, each eliminator sheet thereby being engaged by a recess on each of said spacing members; and (d) means for selectively securing one of said pairs of spacing members to said housing at a plurality of lateral positions on said housing, whereby the position of said eliminator sheets relative to said aperture end of said housing is adjustable so that the direction of flow of humidified air from said aperture end can be changed.

2. The eliminator sheet assembly according to claim 1 wherein said recesses of said one of said pairs of spacing members are defined by equal-sided angles cut into an edge of each of said spacing members of said one of said pairs, the apexes of said angles engaging said eliminator sheets.

3. A system for distributing humidified air, said system comprising a duct, said duct having an inlet and at least one outlet, said inlet serving to admit a flow of humidified air into said duct, said admitted flow having entrained droplets, said outlet enabling humidified air to be distributed from said duct, an eliminator sheet assembly being mounted at said outlet of said duct to remove a limited part of the droplets entrained in said admitted flow, said eliminator sheet assembly being affixed to a wall of said duct by mounting members comprising:

(a) an upper bar mounted to extend along said wall of said duct to define a first track for mounting an upper edge of said eliminator sheet assembly; and (b) a lower bar mounted to extend along said wall of said duct parallel to said upper bar, said lower bar having two parallel faces extending between two coved edges, a first of said coved edges having sidewalls defining a second track running parallel with said first track for mounting a lower edge of said eliminator sheet assembly, the second of said coved edges forming a groove into which said wall of said duct is secured, one of the sidewalls defining said second track extending upward of the other sidewall and outward from a face of said lower bar so that said extended sidewall can capture droplets emitted from said eliminator sheet assembly.

4. The duct system according to claim 3 wherein said lower bar further includes a channel formed in one of said parallel faces so that said lower bar can be spliced end to end to a similar bar by a rod extending in said channel and in a similar channel in the similar bar.

* * * * *